United States Patent
Richardson

(10) Patent No.: US 9,815,051 B2
(45) Date of Patent: *Nov. 14, 2017

(54) PREPARATION OF TRIHALIDE ANION EXCHANGE RESINS

(71) Applicant: University of Florida Research Foundation, Inc., Gainesville, FL (US)

(72) Inventor: David Ernest Richardson, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,159

(22) Filed: Jul. 15, 2016

(65) Prior Publication Data

US 2016/0325275 A1 Nov. 10, 2016

Related U.S. Application Data

(62) Division of application No. 14/420,784, filed as application No. PCT/US2013/054724 on Aug. 13, 2013, now Pat. No. 9,393,558.

(60) Provisional application No. 61/836,393, filed on Jun. 18, 2013, provisional application No. 61/682,368, filed on Aug. 13, 2012.

(51) Int. Cl.
| | |
|---|---|
| *B01J 41/14* | (2006.01) |
| *C02F 1/42* | (2006.01) |
| *C02F 1/76* | (2006.01) |
| *B01J 47/12* | (2017.01) |
| *C08F 8/18* | (2006.01) |
| *B01J 41/05* | (2017.01) |

(52) U.S. Cl.
CPC .............. *B01J 41/14* (2013.01); *B01J 41/05* (2017.01); *B01J 47/12* (2013.01); *C02F 1/42* (2013.01); *C02F 1/76* (2013.01); *C08F 8/18* (2013.01)

(58) Field of Classification Search
CPC .. B01J 41/01; B01J 41/05; B01J 47/12; C02F 1/42; C02F 1/76; C08F 8/18
USPC ........................................................ 521/31
See application file for complete search history.

(56) References Cited

U.S. PATENT DOCUMENTS

| | | |
|---|---|---|
| 3,436,345 A | 4/1969 | Goodenough |
| 3,565,872 A | 2/1971 | Katchalski et al. |
| 3,817,860 A | 6/1974 | Lambert etal. |
| 3,923,665 A | 12/1975 | Lambert et al. |
| 4,190,529 A | 2/1980 | Hatch |
| 4,420,590 A | 12/1983 | Gartner |
| 4,594,361 A | 6/1986 | Beauman et al. |
| 4,594,392 A | 6/1986 | Hatch |
| 5,431,908 A * | 7/1995 | Lund ........................ B01J 41/05 424/78.1 |
| 6,045,820 A | 4/2000 | Messier |
| 6,562,885 B1 | 5/2003 | Moorehead et al. |
| 7,186,671 B2 | 3/2007 | Smith et al. |
| 7,964,138 B2 | 6/2011 | Richardson et al. |
| 2005/0061746 A1 | 3/2005 | Smith et al. |
| 2009/0169446 A1 | 7/2009 | Amendola et al. |
| 2010/0032358 A1 | 2/2010 | Vestergaard Frandsen |

FOREIGN PATENT DOCUMENTS

GB          1065479          4/1967

OTHER PUBLICATIONS

Barbara et al. "Ion Exchange Resins: Catalyst Recovery and Recycle", Chem. Rev. 2009,109, 515-529.*
Barbaro, P. et al., "Ion Exchange Resins: Catalyst Recovery and Recycle," *Chem. Rev.*, 2009, pp. 515-529, vol. 109.
Bongini, A. et al., "Chlorination of Organic Compounds by Means of Polymer-supported Chlorine," *J.C.S. Chem. Comm.*, 1980, pp. 1278-1279.
Chattaway, F.D. et aL, Perhalides of Quaternary Ammonium Salts, *J. Chem. Soc.*, 1923, pp. 654-662, vol. 123.
Irving, H. et al., "The Absorption of Polybromide Ions on an Anion Exchange Resin," *J. Inorg. Nucl. Chem.*, 1964, pp. 2235-2239, vol. 26.
Wayman, M. et al., "Chlorine Exchange Resins," *Can. J. Chem. Eng.*, 1968, pp. 282-287, vol. 46.
Schlama, T. et al., "Tetraethylammonium Trichloride: A Versatile Reagent for Chlorinations and Oxidations," *Angew. Chem. Int. Ed. Engl.*, 1997, pp. 2342-2344, vol. 36, No. 21.
Marchin, G.L. et al., "Contact and Demand-Release Disinfectants," *Critical Reviews in Environmental Control*, 1989, pp. 277-290, vol. 19, No. 4.

* cited by examiner

*Primary Examiner* — Michael M Bernshteyn
(74) *Attorney, Agent, or Firm* — Saliwanchik, Lloyd & Eisenschenk

(57) ABSTRACT

A method of preparing a trihalide resin, where a trihalide ion solution is contacted with a styrene divinylbenzene polymer resin having polymer bonded -$ER_3^+ X^-$ groups where E is N, P, or As, R is a $C_2$-$C_6$ hydrocarbon group and X is Cl, Br, or I. The trihalide ion can be $Cl_3^-$, $Br_3^-$, or $I_3^-$. The trichloride resin can be used as a solid equivalent of chlorine gas. Formation of the styrene divinylbenzene resin comprising -$ER_3^+Cl^-$ units can be used to scavenge chlorine from a gas or liquid to form the styrene divinylbenzene resin comprising -$ER_3^+Cl_3^-$ units. The trihalide resins can be used in disinfecting and as a source of a reagent for chemical synthesis.

10 Claims, 2 Drawing Sheets

PREPARATION OF TRIHALIDE ANION EXCHANGE RESINS

CROSS-REFERENCE TO RELATED APPLICATIONS

This application is a divisional of U.S. application Ser. No. 14/420,784, filed Feb. 10, 2015, now U.S. Pat. No. 9,393,558, which is the U.S. national stage application of International patent application No. PCT/US2013/054724, filed Aug. 13, 2013, which claims the benefit of U.S. Provisional Application Ser. No. 61/682,368, filed Aug. 13, 2012 and U.S. Provisional Application Ser. No. 61/836,393, filed Jun. 18, 2013, the disclosures of which are hereby incorporated by reference in their entireties, including any figures, tables, or drawings.

BACKGROUND OF INVENTION

Redox-active ion exchange resin beads have applications in various areas, particularly in synthesis of organic and inorganic compounds via liquid-solid reaction mixtures. Among other advantages, the solid resin reagent is easily filtered from the heterogeneous reaction mixture or the resin can be packed in a cartridge and the other reagents passed through the cartridge.

Halogens can be bound to a resin in a trihalide form; however, resins in a trihalide form have been prepared, though with varying degrees of efficiency. For example, the traditional production of a tribromide resin, Beauman et al., U.S. Pat. No. 4,594,361, is accomplished by conversion of resin in a chloride form to the bromide form by use of large volumes of bromide salt solution. This process generates a large amount of waste mixed salt solution because the displacement of chloride, while favored, is not displaced efficiently by bromide. Subsequently, bromine is added using a large volume of aqueous solution due to bromine's limited solubility in water. Richardson et al., U.S. Pat. No. 7,964,138 teaches conversion of a prototypical macroreticular resin (e.g. Amberlite® IRA-900) into $Br_3^-$ (resin), which has been extended to gel-type (e.g., Marathon® A) resins.

Chlorine appears to have been bound to resins in the iodide form as $ICl_2^-$, which can serve as a source of chlorine, Hatch, U.S. Pat. No. 4,190,529, for addition reactions, but the reactions suffer with the problem of generating iodine addition products as an impurity of the chlorine addition products. The synthesis and properties of resins in a trichloride form are not known.

Chlorine is produced industrially for many uses, including plastics, basic chemicals, refrigerant gases, solvents, pharmaceuticals and as a disinfectant for water treatment. Chlorine gas is extremely toxic and its release can create a significant public health hazard. For this reason, absorbing chlorine on a solid support in a reversible manner such that it can be handled at a reduced risk yet be useful in an efficient manner is desirable. Various materials and chemicals adsorb chlorine gas; however, most absorb $Cl_2$ irreversibly. The most commonly encountered absorbents are zeolites and materials that are destructive of chlorine, such as alumina and activated carbon. Reversible solid chemisorbents, in which the gas can be adsorbed, or absorbed and removed, are not widely reported in the literature, although the use of an amine resin to provide $Cl_2$ and to permit release on demand has been reported, Wayman et al., J. Can. J. Chem. Eng. 1968, 46, 282.

A few salts of $Cl_3^-$ have been shown to serve as $Cl_2$ sources. The equilibrium formation of trichloride ion in aqueous solution is well known by the reaction:

$$Cl^-(aq) + Cl_2 \rightleftharpoons Cl_3^-(aq). \quad (1)$$

The equilibrium constant for this reaction is $0.18\ M^{-1}$, so, in dilute solution, $Cl_2$ will be 50% in the form of $Cl_3^-$ in a solution that is $1/0.18 = 5.6$ M in chloride ion. Trichloride ion can be stabilized in a solid resin free salt by using an appropriate counterion, as disclosed, for example, in Chattaway et al., J Chem Soc 1923, 123, 654, and Schlama et al., Angew. Chem.-Int. Edit. Engl. 1997, 36, 2342. Stable polymeric resins in the trichloride form have not been reported and chloride-form resins have not been used as reversible chlorine chemisorbents. Typical standard anion exchange resins in the chloride form have low affinity of chlorine via the equation:

$$Cl^-(res) + Cl_2 \rightleftharpoons Cl_3^-(res). \quad (2)$$

For this reason $Cl_3^-$ bound resins that reversibly bind chlorine for use in a relatively safe method for delivering chlorine have not been publically disclosed and there remains a need for an effective and efficient method of preparing trihalide resins and, particularly, a trichloride resin.

BRIEF SUMMARY

An embodiment of the invention is directed to a method of rapidly preparing a trihalide resin where a solution comprising a trihalide ion is combined with a styrene divinylbenzene polymer resin having polymer bonded $-ER_3^+X^-$ groups where R is a hydrocarbon group and X is Cl, Br, or I and E=N,P, or As. For example the trihalide ion can be a tribromide ion and the $-NR_3^+X^-$ group can be a $-NR_3^+Cl^-$ or $-NR_3^+Br^-$ group.

Other embodiments of the invention are directed to a trichloride resin and a method of preparation of the trichloride resin. The trichloride resin comprises a styrene divinylbenzene polymer resin having polymer bonded $-ER_3^+C_3^-$ groups where R is a $C_2$ or larger hydrocarbon group and E=N, P, or As. A styrene divinylbenzene polymer resin having polymer bonded $-ER_3^+Cl^-$ groups, where R is a $C_2$ or larger hydrocarbon group, is contacted with chlorine gas to prepare the trichloride resin.

In another embodiment of the invention, the trichloride resin is useful for treating water or to carry out chlorination or oxidation reactions in aqueous or non-aqueous media where the presence of halogens larger than chlorine is undesirable. Embodiments of the invention are directed to a method of performing a reaction with chlorine, where a styrene divinylbenzene resin comprising trialkylammonium trichloride units or trialkylphosphonium trichloride units constitute a chlorine source or a chlorine equivalent that reacts with a compound that is known to be reactive with chlorine. Reaction is carried out upon contacting the styrene divinylbenzene resin or chlorine released from the styrene divinylbenzene resin with the reactive species. The reactive species can undergo reaction with chlorine or an oxidized chlorine-comprising compound. When the styrene divinylbenzene polymer resin comprises trialkylammonium trichloride units with alkyl units that are ethyl units or larger, the reactive compound can be in a water solution. When the styrene divinylbenzene polymer resin comprises trialkylammonium trichloride units with alkyl units that are methyl units or larger, the contacting reactive compound can be anhydrous or in an anhydrous fluid, such as an anhydrous organic solvent. Chlorine can be released from the styrene divinylbenzene resin into a fluid comprising a gas or a liquid and that fluid is contacted with the reactive compound. The reactive compound can be an organic compound, inorganic compound or a biomolecule.

DETAILED DISCLOSURE

Figure 1:
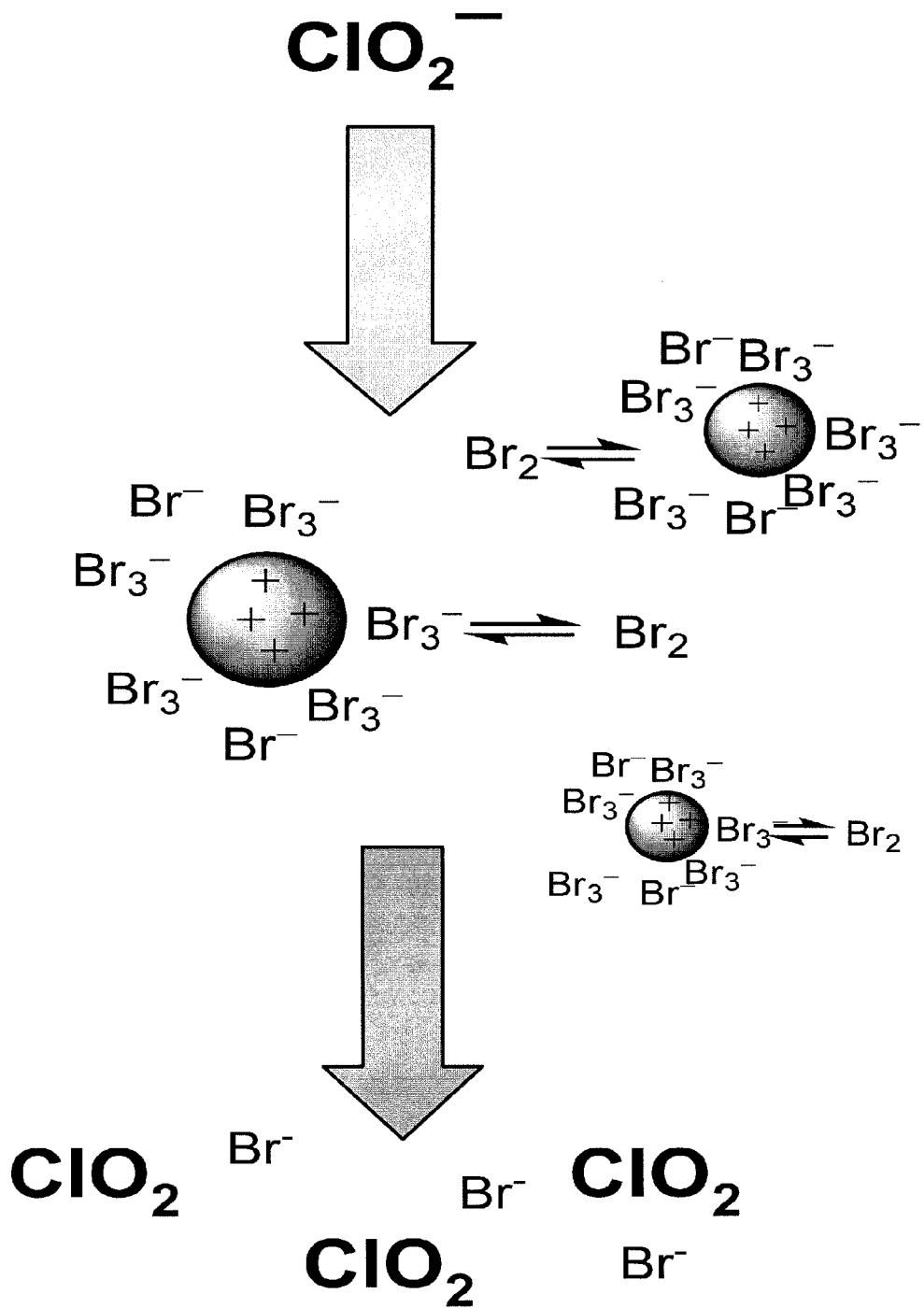
FIG. 1 shows a reaction scheme for a resin-bound tribromide in equilibrium with aqueous bromine that oxidizes chlorite in the precursor solution to produce bound bromide, free bromide, and chlorine dioxide, where release of additional bromine readily oxidizes additional chlorite of precursor solution that flows into the vicinity of the resin, and where the resulting $ClO_2$ solution contains bromide ions.

Embodiments of the invention are directed to the efficient preparation of ion-exchange resins in a trihalide form, for example, a tribromide form and a trichloride form. An embodiment of the invention is directed to an ion exchange resin in a trichloride form. In one embodiment of the invention, the preparation of a resin in a tribromide form comprises the preparation of a metal tribromide solution that is much higher in concentration than that of $Br_2$ in aqueous solution, which is about 33 g/L. Preparation of tribromide redox resins via traditional two-step processes is time consuming and uses copious amounts of reagents.

Traditionally, production of a tribromide redox resin is accomplished by conversion of a washed commercially available chloride resin to the bromide form by use of large volumes of bromide salt solution. This exchange generates a significant amount of waste mixed salts because the displacement of chloride, although favored, is not efficient. Following exchanging the anions to the bromide form, bromine is added; where large volumes of concentrated aqueous bromine solution, approximately 33 g/L, are washed through the bromide resin. In contrast, according to an embodiment of the invention, the process for preparing the tribromide resin involves the ion exchange of a $Br_3^-$ from solution. In this process, an aqueous solution of a bromide salt is mixed with elemental bromine to form the tribromide salt at concentrations that are high, up to about 300 g/L. Bromide salts that can be employed, according to an embodiment of the invention include, but are not limited to, sodium bromide, potassium bromide, lithium bromide, cesium bromide, and ammonium bromide. Alternatively, some, or all, of the halide ion can be supplied by use of an appropriate acid, such as but not limited to hydrobromic acid, to adjust the pH to a desirable value. This reduces significantly the liquid volume required to prepare the tribromide resin relative to the total volume of solution required for conversion of the resin in a chloride form to the tribromide form of the traditional process because a single step with a high concentration solution is used rather than a two-step process where the second step employs a low concentration solution. The displacement of chloride from the starting resin is enhanced because tribromide ion very strongly binds to the resin, much more strongly than the chloride ion. Advantageously, the single displacement method, according to an embodiment of the invention, eliminates the need to transport and store liquid bromine, which is a hazardous and volatile oxidizer. This method can be employed to produce an $I_3^-$ resin by using the equivalent iodine comprising reagents to those of the bromine comprising reagents used to form a $Br^-$ resin disclosed herein, and can be used to produce a $Cl_3^-$ resin when the pH is adjusted, by employing hydrochloric acid or ammonium chloride as the chloride source.

In another embodiment of the invention, the tribromide resin can be prepared in an organic solvent. As with the process disclosed above employing aqueous solutions, the process can be carried out using a protic or aprotic organic solvent, for example, methanol, ethanol, acetonitrile, dimethylsulfoxide, or other solvent with an appropriate cation, for example, a tetraalkylammonium tribromide or a crown ether or cryptand complexed alkali metal tribromide to achieve some solubility of the tribromide salt.

The $K_{eq}$ value for the equilibrium, shown in equation 3, for aqueous bromide and bromine to form tribromide is about 16 $M^{-1}$.

$$Br^-(aq)+Br_2(aq)=Br_3^-(aq). \tag{3}$$

Tribromide ion is in equilibrium as a bound bromide and bromine in a wet resin according to equation 4:

$$Br^-(res)+Br_2(aq)=Br_3^-(res). \tag{4}$$

However, the $K_{eq}$ is dramatically higher, greater than 1,000 $M^{-1}$, in the bound system of equation 4, which is presumably a consequence of about a 50 fold higher affinity of tribromide ion for the resin relative to bromide ion. The reaction of equation 4 is reversible, which allows the tribromide resin to serve as a solid state reservoir of $Br_2$. Hence, a tribromide resin is a more concentrated form of bromine than is saturated aqueous bromine or $Br_2$ vapor, where typical resins can be about 20 to about 40% $Br_2$ by weight. Washing the resin with pure water removes bromine from the resin, but at a very slow rate. In this manner the tribromide resin serves as a reservoir of bromine, and bromine is released upon demand by reaction with reagents in a solution that comes in contact with the resin. For example, passage of a chlorite solution through the resin produces $ClO_2$ by reaction of the free bromine in equilibrium with the tribromide resin with chlorite. The free bromine is rapidly replenished by the tribromide resin via the shift of the tribromide/bromine equilibrium reaction to form bromine, as shown in FIG. 1.

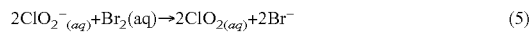
$$2ClO_2^-{}_{(aq)}+Br_2(aq) \rightarrow 2ClO_{2(aq)}+2Br^- \tag{5}$$

While the reaction cleanly converts $ClO_2^-$ to $ClO_2$, the chlorine dioxide solution also contains bromide ion. Bromide ion is undesirable in many product solutions. For example, bromine is not used in drinking water disinfection because of the formation of bromide, which has very low allowable concentration. Chloride is not a problem in drinking water, or for many other applications. Therefore, a trihalide resin where only chloride ion and chlorine-derived products can be released is very desirable.

In an embodiment of the invention, a trichloride resin comprises a styrene divinylbenzene polymer resin having polymer bonded -$ER_3^+Cl_3^-$ groups, where R is a hydrocarbon group that is larger than methyl and E=N, P, or As. Methyl is the common R group of quaternary amine-based anion exchange resins, such as IRA-900, Marathon® A and most other commercial anion exchange resins. Amberlite® IRA-900 and Dowex Marathon® A are styrene divinylbenzene polymer resins with trimethylammonium chloride functional groups. Specialty commercially available resins with larger R groups, for example, ethyl, butyl, or hexyl, are sold for selective binding and removal of relatively large ions, for example, perchlorate or nitrate ions, from water by ion exchange. Surprisingly, it was discovered that the resins with large R groups display stability in the presence of chlorine, unlike those where R is methyl. According to an embodiment of the invention, quaternary ammonium resins with large R groups bind $Cl_3^-$ reversibly with a high affinity, permitting these $Cl_3^-$ resins to release chlorine in a controlled manner. Resins that can be used to prepare the $Cl_3^-$ resins, according to an embodiment of the invention, include, but are not limited to: Purolite® A520E, where R is ethyl; Purolite® A530E, where R is a mixture of ethyl and hexyl; and Amberlite® PWA2, where R is a mixture of ethyl and hexyl. The resin can be any styrene divinylbenzene polymer resins containing —$NR_3^+Cl^-$ groups and where the R groups are ethyl, butyl, hexyl, or other alkyl group larger than methyl, or other groups such as phenyl or substituted phenyl groups, groups that contain mixtures of alkyl and phenyl components, or a mixture of such R groups. In addition, other bulky positive groups can be substituted for —$NR_3^+$, including but not limited to —$PR_3^+$ and —$AsR_3^+$.

In an embodiment of the invention, trichloride resins are prepared from chloride resins. In one exemplary embodiment of the invention, a styrene divinylbenzene polymer resin having polymer bonded —$NR_3^+Cl^-$ groups, where R is a hydrocarbon group larger than methyl, including, but not limited to, ethyl and butyl, is placed in a column, for example, a glass column, with a resin support, for example, a glass frit, and a controlling valve, for example, a stopcock, at the bottom of the column. The resin in the column can be prewashed and dried or used as received. A source of chlorine gas is connected to bottom of the column through the valve. The outlet at the top of the column can be fitted with a tube to direct the gas output through a trap as needed. Chlorine gas is slowly passed into the resin bed by opening the stopcock at the bottom of the column where the stopcock is adjusted to control the gas flow. An immediate exothermic reaction results as the gas is absorbed by the resin, and the generation of a bright yellow color on the resin is observable. The chlorine flow is controlled such that only a slow temperature increase is observed in the column. Alternatively, the chlorine gas is diluted, for example, with nitrogen or argon, to assist in heat management. When chlorination of the resin is complete, no additional heat generation occurs.

In an embodiment of the invention, the styrene divinylbenzene polymer resin having polymer bonded —$NR_3^+Cl^-$ groups, where R is a $C_2$ or larger hydrocarbon group, including, but not limited to, ethyl, butyl, or hexyl, is suspended in a dilute HCl solution, for example, 0.1M HCl, and the suspension agitated with the introduction of $Cl_2$ gas to the suspension until no further gas adsorption and color change is observed. Alternatively, a portion of the acid can be substituted by chloride salts, where the pH is maintained in a range where trichloride ion is formed in solution. Alternative acids to HCl can be used with chloride salts as long as the anion of the acid does not interfere with trichloride binding. The resulting yellow resin is washed, for example, with distilled water to remove acid prior to use.

In an embodiment of the invention, the styrene divinylbenzene polymer resin having polymer bonded —$NR_3^+Cl^-$ groups where R is an ethyl or larger hydrocarbon group, including, but not limited to, ethyl, butyl, or hexyl, is dried and suspended in dichloromethane or other appropriate solvent, such as acetonitrile. Treatment of the suspension with $Cl_2$ gas is carried out until no further gas adsorption and color change is observed. The resulting resin is dried and can be transferred to a sealed container for storage. Alternatively the yellow resin after chlorine addition can be washed with water and dried for storage or the yellow resin can be used immediately. Resin degradation following the exposure to chlorine appears to be minimal or absent in the $Cl_3^-$ resins prepared in this manner.

Figure 2:
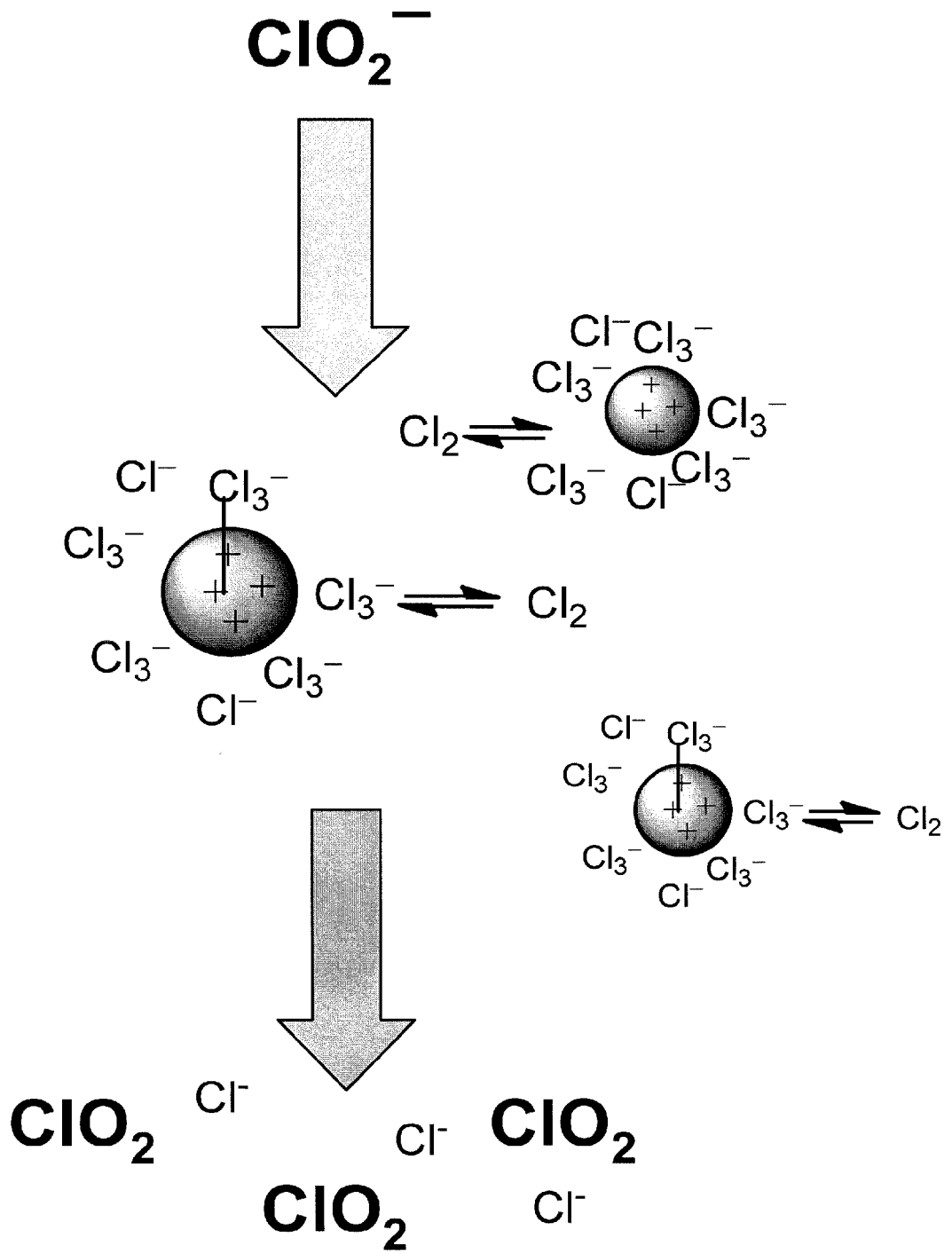
FIG. 2 shows a reaction scheme for a resin-bound trichloride in equilibrium with aqueous chlorine that oxidizes chlorite in the precursor solution to produce bound chloride, free chlorine, and chlorine dioxide, where release of additional chlorine readily oxidizes additional chlorite of precursor solution that flows into the vicinity of the resin and where the resulting $ClO_2$ solution contains chloride ions.

The trichloride bound resin is useful as a chlorine equivalent for water treatment or for an oxidation or chlorination reaction, according to an embodiment of the invention. The trichloride resin is useful as a chlorine equivalent for reaction with reactive compounds in an aqueous solution, a non-aqueous solution, or neat, according to embodiments of the invention. For example, the trichloride resin can be used to transform $ClO_2^-$ to $ClO_2$ by contacting an aqueous solution comprising $ClO_2^-$ with the trichloride resin, as shown in FIG. 2, where the anions in the resulting $ClO_2$ solution are chloride ions, which are desirable for many uses of $ClO_2$ solutions.

The trichloride resin comprises an oxidizer for a reducing agent in a non-aqueous solution. For example, according to an embodiment of the invention, the trichloride resin serves as a solid-state source of chlorine for chlorination reactions of reactive compounds, including, but not limited to, alkanes, aldehydes, amines, ketones, alkenes, alkynes, esters, ethers, aromatics, and alcohols. According to an embodiment of the invention, the trichloride resin can serve as a source of chlorine for oxidation or chlorination reactions with inorganic species, including, but not limited to, transition metal compounds, main group metal compounds, and inorganic compounds such as ammonia, bromide, iodide, cyanide, nitrite, sulfite, and sulfide. According to an embodiment of the invention, the trichloride resin can serve as source of chlorine for reactions with biomolecules, including proteins, carbohydrates, lipids, and nucleic acids.

The chloride resin used for preparation of the trichloride resin can serve as a reversible chlorine gas absorbent. The trichloride resin can serve as a disinfectant through the release of chlorine from the solid into a gas phase or into solution. The chlorine can be absorbed on an anhydrous styrene divinylbenzene resin having polymer bonded -$ER_3^+$ $Cl^-$ groups by contacting with chlorine gas, either neat or in a mixture of gases, for example, diluted with nitrogen, argon, or dry air. Subsequently, the absorbed chlorine on the divinylbenzene resin, having polymer bonded -$ER_3^+Cl_3^-$ groups, can be used for the release of chlorine or as a reagent for chlorination reactions.

It was discovered that a styrene divinylbenzene resin, having polymer bonded -$ER_3^+Cl_3^-$ groups, where R is a hydrocarbon group that is larger than methyl and E=N, P, or As, could be prepared in the presence of water, where the resin is stable when the resin has large R groups, but not where R is methyl. Methyl is the common R group of quaternary amine-based anion exchange resins. IRA-900, Marathon® A and most other commercial anion exchange resins, including, but not limited to, Amberlite® IRA-900 and Dowex Marathon® A, are styrene divinylbenzene resins with trimethylammonium chloride functional groups. Specialty resins with larger R groups, for example, ethyl, butyl, or hexyl, are commercially available for selective binding and removal of relatively large ions, for example, perchlorate or nitrate ions, from water by ion exchange. Resins that can be used to prepare the $Cl_3^-$ resins with large R groups include: Purolite® A520E, where R is ethyl; Purolite® A530E, where R is a mixture of ethyl and hexyl; and Amberlite® PWA2, where R is a mixture of ethyl and hexyl.

The resin can be any styrene divinylbenzene resins containing —$NR_3^+Cl^-$ groups and where the R groups are: ethyl, butyl, hexyl, or other alkyl group larger than methyl; phenyl or substituted phenyl groups; alkylaryl components; or any mixture of such R groups. In addition, other bulky positive groups can be substituted for —$NR_3^+$, including, but not limited to, —$PR_3^+$ and —$AsR_3^+$.

In an embodiment of the invention, the styrene divinylbenzene resin having polymer bonded -$ER_3^+Cl^-$ groups is placed in a column or other container, and a source of chlorine gas is connected to the container. A chlorine comprising gas is passed into the resin at a controlled rate, primarily to control the heating of the resin due to exothermic formation of the $Cl_3$ resin. It has been discovered that styrene divinylbenzene resins having polymer bonded -$ER_3$+$Cl^-$ groups can be employed where R is methyl when the resin is anhydrous before chlorination. The resins as received from commercial sources have significant water content. The resin can be dried in an oven at a temperature sufficient to remove water but below the temperature that would cause resin decomposition. The resin is dried until no further weight loss due to dehydration can be detected. In this manner, a styrene divinylbenzene resin having polymer bonded —$N(CH_3)_3^+Cl^-$ can be used as a reversible $Cl_2$ source. IRA-900, Marathon® A, Amberlite® IRA-900, and Dowex Marathon® A or other styrene divinylbenzene resins with —$N(CH_3)_3^+Cl^-$ groups can be used. By passing chlorine gas through a bed of the resin, approximately 10 to 12% by weight chlorine can be bound to the resin.

In another embodiment of the invention, anhydrous trichloride resins can be prepared as dry resins by washing the resin with a dry aprotic solvent, such as acetonitrile or dichloromethane, to form a solvent swollen resin that is dried by passing nitrogen or other dry inert gas through a bed of the swollen resin. Chlorination of the swollen resin is performed by passing $Cl_2$ through the swollen resin. Anhydrous chloride resin with small R groups, for example, methyl or ethyl groups, can be used to absorb chlorine from a gas stream. In this manner, $Cl_2$ can be scrubbed from an environment by directing chlorine containing air through a bed of the anhydrous styrene divinylbenzene resin having polymer bonded -$ER_3^+Cl^-$ groups. It is often appropriate to direct the air through a desiccant bed prior to introduction to the resin bed; for example, the desiccant can be calcium chloride or magnesium sulfate.

The chlorine bound trichloride resins can be used for bleaching and decontamination as solid bleach. Unlike high test hypochlorite (HTH) and super tropical bleach (STB), which are not suited for use as a column packing through which a fluid can flow, styrene divinylbenzene resin having polymer bonded -$ER_3^+Cl_3^-$ groups, where R is ethyl or larger, can be used as a bleaching agent in a flow through system. Concentrated bleach, exceeding the normal liquid concentration of sodium hypochlorite, can be produced from the styrene divinylbenzene resin having polymer bonded -$ER_3^+Cl_3^-$ groups, and the level of bleach release is similar to that achieved by other high bleaching power compositions.

The anhydrous styrene divinylbenzene resin having polymer bonded -$ER_3^+Cl^-$ groups can be employed as a safe and convenient source of elemental chlorine. Rather than gaseous chlorine, the anhydrous styrene divinylbenzene resin having polymer bonded -$ER_3^+Cl_3^-$ can be directly employed for chlorination reactions in industrial processes, pharmaceutical manufacturing, specialty chemical manufacturing, and in research. Chlorinated resins can be used to replace gaseous chlorine in chlorination reactions without the need for gas handling and transport. The reaction product selectivity and the completeness of conversion are similar when using the resins having polymer bonded -$ER_3^+C_3^-$ or free $Cl_2$ gas. For example, a suspension of resin containing a stoichiometric excess of chlorine in anhydrous acetonitrile or dichloromethane will efficiently chlorinate organic compounds with double bonds, for example, cyclohexene, where the rate and product distribution is similar to that when chlorine gas is used directly in a traditional chlorination reaction.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A method of preparing a trihalide resin, comprising:
providing a solution comprising trihalide ion, wherein the trihalide ion is tribromide ion or triiodide ion;
providing a styrene divinylbenzene polymer resin having polymer bonded -$ER_3^+X^-$ groups, wherein: R is a hydrocarbon group; E=N, P, or As; and $X^-$ is $Cl^-$, $Br^-$, or $I^-$; and
contacting the styrene divinylbenzene polymer resin with the solution comprising trihalide ion to form a trihalide resin, wherein the halide of the trihalide ion is of greater than or equal atomic mass of the $X^-$.

2. The method according to claim 1, wherein the solution comprises trihalide ion and water.

3. The method according to claim 1, wherein the solution comprises trihalide ion and an organic solvent.

4. The method according to claim 3, wherein the organic solvent comprises a halogenated solvent or acetonitrile.

5. The method according to claim 1, wherein the trihalide ion is tribromide ion.

6. The method of claim 5, wherein the -$NR_3^+$ $X^-$ groups are -$N(CH_3)_3^+$ $X^-$ where $X^{31}$ is chloride or bromide.

7. The method of claim 1, further comprising washing the trihalide resin.

8. The method of claim 1, further comprising drying the trihalide resin.

9. The method of claim 1, wherein R is a $C_2$ or larger alkyl group.

10. The method of claim 7, wherein washing is washing with water.

* * * * *

UNITED STATES PATENT AND TRADEMARK OFFICE
CERTIFICATE OF CORRECTION

Page 1 of 1

PATENT NO. : 9,815,051 B2
APPLICATION NO. : 15/211159
DATED : November 14, 2017
INVENTOR(S) : David Ernest Richardson It is certified that error appears in the above-identified patent and that said Letters Patent is hereby corrected as shown below:

In the Specification

Column 7,
Line 14, "the $Cl_3$ resin" should read --the $Cl_3^-$ resin--.

In the Claims

Column 8,
Line 50, "where $X^{31}$ is" should read --where $X^-$ is--.

Signed and Sealed this
Twenty-sixth Day of June, 2018

Andrei Iancu
*Director of the United States Patent and Trademark Office*